(12) United States Patent
Saukkonen et al.

(10) Patent No.: US 11,346,057 B2
(45) Date of Patent: May 31, 2022

(54) LAMINATE HAVING OXYGEN BARRIER PROPERTIES AND A METHOD FOR PRODUCING THE SAME

(71) Applicant: Stora Enso OYJ, Helsinki (FI)

(72) Inventors: Esa Saukkonen, Lappeenranta (FI); Isto Heiskanen, Imatra (FI); Ville Ribu, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 44 days.

(21) Appl. No.: 16/955,928

(22) PCT Filed: Dec. 18, 2018

(86) PCT No.: PCT/IB2018/060240
§ 371 (c)(1),
(2) Date: Jun. 19, 2020

(87) PCT Pub. No.: WO2019/123238
PCT Pub. Date: Jun. 27, 2019

(65) Prior Publication Data
US 2020/0318293 A1    Oct. 8, 2020

(30) Foreign Application Priority Data

Dec. 21, 2017  (SE) .................................... 1751596-6

(51) Int. Cl.
| | | |
|---|---|---|
| D21H 27/10 | (2006.01) |
| B32B 27/10 | (2006.01) |
| B32B 27/32 | (2006.01) |
| D21H 11/18 | (2006.01) |
| D21H 19/22 | (2006.01) |

(52) U.S. Cl.
CPC ............ *D21H 27/10* (2013.01); *B32B 27/10* (2013.01); *B32B 27/32* (2013.01); *D21H 11/18* (2013.01); *D21H 19/22* (2013.01)

(58) Field of Classification Search
USPC ....................................................... 162/135
See application file for complete search history.

(56) References Cited

U.S. PATENT DOCUMENTS

| | | | |
|---|---|---|---|
| 6,537,680 B1 * | 3/2003 | Norlander | ............... B32B 29/00 428/532 |
| 2010/0024998 A1 | 2/2010 | Wildlock et al. | |
| 2012/0251818 A1 | 10/2012 | Axrup et al. | |
| 2017/0335522 A1 | 11/2017 | Heiskanen et al. | |

FOREIGN PATENT DOCUMENTS

| | | |
|---|---|---|
| EP | 2554589 A1 | 6/2013 |
| SE | 1650900 A1 | 11/2017 |
| WO | 2011078770 A1 | 6/2011 |
| WO | 2014147295 A1 | 9/2014 |
| WO | 2015034426 A1 | 3/2015 |
| WO | 2016185397 A1 | 11/2016 |
| WO | 2017152217 A1 | 9/2017 |
| WO | 2017221137 A1 | 12/2017 |

OTHER PUBLICATIONS

Mo, Chen, Effects of Temperature and Humidity on the Barrier Properties of Biaxially-Oriented Polypropylene and Polyvinyl Alcohol Films, Journal of Applied Packaging Research, vol. 6, No. 1, Article 5, 2014.

* cited by examiner

*Primary Examiner* — Mark Halpern
(74) *Attorney, Agent, or Firm* — Greer, Burns & Crain, Ltd.

(57) ABSTRACT

The present invention relates to a laminate having oxygen barrier properties, which laminate comprises; a porous fiber based layer comprising nanocellulose and cellulosic fibers wherein said fiber based layer has an air resistance of less than 4000 s/100 ml measured according to ISO5636/6 and a polymer layer attached to at least one side of said fiber based layer to form said laminate. The present invention further relates to a method to produce said laminate and a paper or paperboard product comprising the laminate and the use of the laminate.

20 Claims, No Drawings

LAMINATE HAVING OXYGEN BARRIER PROPERTIES AND A METHOD FOR PRODUCING THE SAME

This application is a U.S. National Phase under 35 U.S.C. § 371 of International Application No. PCT/IB2018/060240, filed Dec. 18, 2018, which claims priority under 35 U.S.C. §§ 119 and 365 to Swedish Application No. 1751596-6, filed Dec. 21, 2017.

The present invention relates to a fiber based laminate having oxygen barrier layers. The invention further relates to a method for producing the laminate and a paper or paperboard comprising said laminate and the use of the laminate as a pouch or a wrapping paper.

BACKGROUND OF THE INVENTION

For many packaging solutions it is important to have an effective oxygen barrier for shielding the products that are oxygen-sensitive, thereby extending their shelf-life. These include many food products in particular.

Microfibrillated cellulose (MFC) films, in which fibrils are bonded to one another through hydrogen bonds, is one solution that could give a package good gas barrier properties. The publication EP 2 554 589 A1 describes preparation of such films, in which an aqueous cellulose nanofiber dispersion is coated on a paper or polymeric substrate, dried and finally peeled off as a nanofiber film sheet. Embodiments taught for improving the gas barrier film include addition of an inorganic compound for improving the water vapor impermeability in humid conditions, as well as adding a thermoplastic polymer layer to lend heat-sealability.

WO 2015/034426 A1 describes MFC film as an oxygen barrier polymer film for food or liquid packaging purposes. The MFC film is fabricated by vacuum filtration of a fibrillated cellulose suspension, followed by drying.

WO 2011/078770 A1 describes fiber-based packaging materials comprising a paper or paperboard substrate, a thin MFC layer, and an outermost polymer layer preferably of PE or PET. The MFC layer is preferably added to the substrate by wet coating, and the polymer layer is brought onto the MFC layer by lamination or extrusion coating. The combination of MFC and polymer is said to lend the material barrier properties such as resistance against oxygen and vapor.

The gas barriers lent by a MFC film according to prior art are all based on the non-porous plasticized character of the film. To achieve a superior oxygen barrier with a good oxygen transmission rate (OTR) the film must be manufactured at low production speeds, which is costly.

There is thus a need for a solution to produce a laminate having good oxygen properties at the same time as it is possible to produce at high production speeds.

SUMMARY OF THE INVENTION

It is an object of the present invention, to provide a laminate having oxygen barrier properties comprising a porous fiber based layer comprising microfibrillated cellulose and a polymer layer.

It is an object of the present invention to provide a laminate comprising nanocellulose which laminate can be produced at high production speed and still have oxygen barrier properties.

The invention is defined by the appended independent claims. Embodiments are set forth in the appended dependent claims and in the following description and drawings.

The present invention relates to a laminate having oxygen barrier properties, which laminate comprises; a porous fiber based layer comprising nanocellulose and cellulosic fibers wherein said fiber based layer has an air resistance of less than 4000 s/100 ml measured according to ISO5636/6 and a polymer layer attached to at least one side of said fiber based layer to form said laminate. It has surprisingly been found that it is possible to produce a laminate having oxygen barrier properties by combining a porous fiber based layer comprising nanocellulose with a polymer layer even though neither the fiber based layer nor the polymer layer per se has good oxygen barrier properties. The combination of nanocellulose and cellulosic fibers has been shown to be needed in order to produce the porous fiber based layer in an efficient way.

The fiber based layer comprises 40-90 wt-% of nanocellulose based on the total cellulosic content of the fiber based layer, preferably between 60-90 wt-%. The fiber based layer preferably comprises 10-60% by weight of cellulosic fibers based on the total cellulosic content of the fiber based layer, preferably between 10-40 wt-%. The amount of nanocellulose and cellulosic fibers can be varied depending on the desired end use of the laminate.

The cellulosic fibers preferably have an SR value below 60. Thus, the cellulosic fibers are not a fine fiber fraction or a nanocellulose. It may be preferred that "normal" cellulosic fibers, such as chemical, chemi-thermomechanical and/or mechanical cellulosic pulp fibers are used. Preferred cellulosic fibers are chemical pulp fibers, e.g. kraft pulp fibers, chemi-thermomechanical pulp fibers and/or mechanical pulp fibers.

The laminate preferably has an Oxygen Transmission Rate (OTR) value below 2000 ml/m$^2$/per 24 h at 23° C. determined at 50% relative humidity (RH), preferably below 1000 ml/m$^2$/per 24 h at 23° C. determined at 50% relative humidity (RH) and/or an Oxygen Transmission Rate (OTR) value below 5000 ml/m$^2$/per 24 h at 38° C. determined at 85% relative humidity (RH), preferably below 3000 ml/m$^2$/per 24 h at 38° C. determined at 85% relative humidity (RH) in accordance with ASTM D 3985-05. It has surprisingly been found that it is possible to produce a laminate having good oxygen barrier properties by combining two layers having that alone has very poor or even no oxygen barrier properties.

The fiber based layer preferably has an Oxygen Transmission Rate (OTR) value above 10000 ml/m$^2$/per 24 h at 23° C. determined at 50% relative humidity (RH) in accordance with ASTM D 3985-05. Thus, the fiber based layer has very poor oxygen barrier properties.

The fiber based layer has a KIT value below 4 measured according to TAPPI T559. The KIT value is a measure of the grease resistance of the fiber based layer. A low value indicates a poor grease resistance. It was surprising that the fiber based layer can give a laminate with good grease resistance even though the fiber based layer has poor KIT value.

The fiber based layer preferably has a specific formation higher than 0.55, preferably above 0.7 measured by use of Ambertec Beta formation instrument according to standard SCAN-P 92:09. Specific formation value is calculated as formation divided by the square root of the film grammage. It was surprising that a fiber based layer with such poor formation still was able to be used when producing a laminate having oxygen barrier properties.

The fiber based layer preferably as a density above 500 kg/m$^3$, preferably between 550-850 kg/m$^3$.

The polymer of the laminate is preferably a polyolefin, such as polyethylene (PE) or polypropylene (PP). It was surprising that a porous fiber based layer and a polyolefin layer could be combined into a laminate with good barrier properties.

The fiber based layer preferably has a grammage of less than 60 g/m$^2$, preferably less than 45 g/m$^2$ and even more preferred less than 40 g/m$^2$. The grammage of the fiber based layer is preferably between 20-40 g/m$^2$. Thus, even though the grammage of the fiber based layer is low a laminate with good barrier properties is achieved.

The polymer layer preferably has a grammage of less than 35 g/m$^2$, preferably below 30 g/m$^2$, and even more preferably below 25 g/m$^2$. The grammage of the polymer layer is preferably between 15-25 g/m$^2$. Even though the grammage of the polymer layer is low, a laminate with good barrier properties is achieved. The grammage mentioned of the polymer layer is for a single polymer layer.

The fiber based layer is porous and preferably has a porosity or permeability below 4000 s/100 ml (Gurley Hill) measured according to ISO 5636-5, more preferably below 3000 s/100 ml and even more preferably below 2000 s/100 ml. The Gurley Hill measurement is a measure on how porous/air permeable the fiber based layer is.

The fiber based layer is preferably produced by wet-laid technology at a production speed of at least 250 m/min. A big advantage with the present invention is that it is possible to produce a laminate having good oxygen barrier properties at high speed. Since it was found possible to combine a porous fiber based layer with a polymer layer and then produce a laminate having good barrier properties. A porous fiber based layer is easier to produce compared to denser fiber based layers, e.g. films comprising high amounts of nanocellulose.

The nanocellulose is preferably microfibrillated cellulose.

The present invention further relates to a method for producing a laminate having oxygen barrier properties which method comprises the steps of: providing a slurry comprising nanocellulose and cellulosic fibers, forming a fiber based layer having an air resistance of less than 4000 s/100 ml measured according to ISO5636/6 from said slurry, providing a polymer layer, attaching the polymer layer to at least one side of the fiber based layer characterized in the formation of the fiber based layer is done at a production speed of at least 250 m/min. It has surprisingly been found possible to produce a laminate having good barrier properties at a high speed. It may also be possible to attach a polymer layer on both sides of the fiber based layer.

The formation of the fiber based layer preferably comprises the steps of: conducting said slurry to a wire to form a web, dewatering the web on the wire and drying the web to form said fiber based layer. It is thus possible to produce the laminate on a paper or board machine at high speed.

The formation of the fiber based layer may also comprise the steps of: conducting said slurry to a substrate by cast coating to form a web, optionally removing said web from the substrate and drying the web to form said fiber based layer. It may also be possible to produce the laminate by cast coating technique.

The present invention further relates to a paper or paperboard product laminated with the laminate described above. The laminate may be laminated to at least one side of the paper or paperboard product by any known method. It may be possible to laminate both sides of the paper or paperboard product with the laminate according to the invention.

The present invention also relates to the use of the laminate as a wrapping paper or as a pouch.

DETAILED DESCRIPTION

It has surprisingly been found that it is possible to produce a laminate having good or moderate oxygen barrier properties from the combination of a porous fiber based layer comprising nanocellulose and cellulosic fibers and a polymer layer. The reason for the synergistic and surprising effect found when producing a laminate having a porous fiber based layer and a polymer layer is not fully understood. One explanation might be due to the adhesion properties between the two layers and/or due to the crystallinity of the polymer layer.

Another advantage with the present invention is that the adhesion between the fiber based layer and the polymer layer is increased compared to if the fiber based layer is non-porous. Thus, the risk for delamination of the layers of the laminate is reduced which also give the laminate a higher strength. Reduced risk for lamination is important in converting of the laminate to different end uses. Furthermore, the porous fiber based layer will also increase the strength of the laminate. The porous fiber based layer will increase the tear strength of the laminate compared to if a non-porous layer is used. Improved tear strength is also beneficial if/when the laminate is converted into packages.

The polymer layer gives the laminate both oxygen barrier properties (in combination with the porous fiber based layer) and preferably also heat-sealing properties. It is thus possible to heat-seal the laminate and thus be able to use in many packages where heat-sealablity is important.

The polymer layer can be attached to the fiber based layer by any known method. The polymer layer may be laminated onto the fiber based layer. It is preferred that the polymer layer is applied to the fiber based layer by extrusion coating technology. Other possible techniques may also be applicable, such as dispersion coating or foam coating.

It may be possible to provide at least one side of the fiber based layer with more than one polymer layers, i.e. a multilayer polymer layer. In this way it is possible to provide at least one side of the fiber based layer with a polymer layer comprising two or more different polymer layers. The polymer multilayer may comprise two, three, four, five or six layers.

It may be possible to provide both sides of the fiber based layer with at least one polymer layer. In this way a laminate having good barrier properties on both sides in achieved.

The polymer layer may further comprise tie resins which is blended with the polymer layer to improve adhesion of the polymer layer and the porous fiber based layer. Suitable tie resins may be zinc ionomer of ethylene acid copolymer, sodium ionomer of ethylene acid copolymer, maleic anhydride concentrate polymer and/or zinc ionomer of ethylene acid acrylate terpolymer.

The laminate may be laminated onto a paper or paperboard product forming a laminated paper or paperboard product. The laminated product will have improved barrier properties. Also, the laminated product will have improved strength which is important when converting the laminated product into packages. The laminated fiber based product may be used in packages, such as packages for dry food. The laminated fiber based product may also be used in corrugated board.

The laminate may also be used as a pouch material. The laminate may be used as a pouch for packaging food, either as an inner pouch in a package or as an external package, e.g. pouches for cereals, dried fruit, flour, pasta or similar products.

Another advantage with the present invention is that the laminate has a good mineral oil resistance. Thus, the laminate is a good barrier against oil and/or grease.

The laminate may also be used as a wrapping paper. A benefit with the laminate according to the invention is that it allows water vapor transmission but prevents oxygen to deteriorate the product. It may then be suitable to use as a wrapping paper for food, especially for bread, fruits and/or vegetables. The laminate also has good oil barrier properties making it suitable for wrapping of products with high oil content, e.g. hamburgers, French fries, grease containing metal products etc.

By nanocellulose is meant cellulose fibers that may be any one of microfibrillated cellulose or nanocrystalline cellulose, or a mixture or combinations thereof.

Microfibrillated cellulose (MFC) or so called cellulose microfibrils (CMF) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 $m^2/g$, such as from 1 to 200 $m^2/g$ or more preferably 50-200 $m^2/g$ when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxidation, for example "TEMPO"), or quaternary ammonium (cationic cellulose). After being modified or oxidized in one of the above-described methods, it is easier to disintegrate the fibers into MFC or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, single—or twin-screw extruder, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC can be produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the proposed TAPPI standard W13021 on cellulose nano or microfibril (CMF) defining a cellulose nanofiber material containing multiple elementary fibrils with both crystalline and amorphous regions, having a high aspect ratio with width of 5-30 nm and aspect ratio usually greater than 50.

Example

Thin paper from MFC/pulp mixture was manufactured on a paper machine with running speed of 300 m/min.

Three machine reels were produced, with KP1 containing about 25-35 wt % of slightly refined pine pulp, KP2 containing about 15-20 wt % of slightly refined pine pulp, KP3 containing about 10-15 wt % of slightly refined pine pulp. The slightly refined pulp is refined with 20 kWh/t and has a SR value between 18-35.

All samples were extrusion PE-coated with 25 $g/m^2$ of LDPE (CA7230).

All values besides OTR after PE-coating in the table below were measured on the paper product. Air resistance was measured according to ISO5636/6, KIT value was measure according to TAPPI T559, Specific formation was measured according to SCAN-P 92:09 and the OTR value was measured according to ASTM D 3985-05.

Results from the testing are summarized in Table 1.

TABLE 1

| Sample | MFC content, % | Grammage | KIT-value | Air resistance, s/100 ml | Specific formation, $g^{0.5}$/m | OTR, cc/($m^2$-day) * | OTR after PE-coating, cc/($m^2$-day) in 23° C./50% RH | OTR after PE-coating, cc/($m^2$-day) in 38° C./85% RH |
|---|---|---|---|---|---|---|---|---|
| KP1 (Jun) | 65-75% | 30.5 | <4 | 155 | 0.93 | fail* | 1160 | 2447 |
| KP2 (Jun) | 80-85% | 30.2 | <4 | 182 | 1.03 | fail* | 761 | 1801 |
| KP3 (Jun) | 85-90% | 32.9 | <4 | 1462 | 0.90 | fail* | 749 | 1952 |
| PE-film alone 25 gsm | — | 25.0 | n.d. | n.d. | n.d. | n.d. | n.d. | fail*** |

Fail* means that the OTR value was above 10000 which is the highest value that can be measured with the method.

It is evident from the results in table 1 that the laminate produced can have oxygen barrier properties even though the polymer layer and the fiber based layer per se has no or very poor oxygen barrier properties.

The invention claimed is:

1. A laminate having oxygen barrier properties, wherein the laminate comprises:
   a porous fiber based layer comprising nanocellulose and cellulosic fibers wherein said fiber based layer has an air resistance of less than 4000 s/100 ml measured according to ISO5636/6, wherein the fiber based layer comprises 60-90 wt-% of nanocellulose based on the total cellulosic content of the fiber based layer; and,
   a polymer layer attached to at least one side of said fiber based layer to form said laminate.

2. The laminate according to claim 1, wherein the fiber based layer comprises between 10-60% by weight of cellulosic fibers based on the total cellulosic content of the fiber based layer.

3. The laminate according to claim 1, wherein the cellulosic fibers have an SR value below 60.

4. The laminate according to claim 1, wherein the laminate has an Oxygen Transmission Rate (OTR) value below 2000 ml/$m^2$/per 24 h at 23° C. determined at 50% relative humidity (RH), an Oxygen Transmission Rate (OTR) value below 5000 ml/$m^2$/per 24 h at 38° C. determined at 85% relative humidity (RH) in accordance with ASTM D 3985-05, or both.

5. The laminate according to claim 1, wherein the fiber based layer has an Oxygen Transmission Rate (OTR) value above 10000 ml/$m^2$/per 24 h at 23° C. determined at 50% relative humidity (RH) in accordance with ASTM D 3985-05.

6. The laminate according to claim 1, wherein the fiber based layer has a grease resistance KIT value below 4.

7. The laminate according to claim 1, wherein the fiber based layer has a specific formation above 0.55 measured by use of Ambertec Beta formation instrument according to standard SCAN-P 92:09.

8. The laminate according to claim 1, wherein the fiber based layer as a density above 500 kg/$m^3$.

9. The laminate according to claim 1, wherein the fiber based layer has a porosity or permeability below 4000 s/100 ml (Gurley Hill) measured according to ISO 5636-5.

10. The laminate according to claim 1, wherein the polymer layer comprises a polyolefin.

11. The laminate according to claim 1, wherein the fiber based layer has a grammage of less than 60 g/$m^2$.

12. The laminate according to claim 1, wherein the polymer layer has a grammage of less than 35 g/$m^2$.

13. The laminate according to claim 1, wherein the nanocellulose is microfibrillated cellulose.

14. A method for producing a laminate having oxygen barrier properties, wherein the method comprises the steps of:
   providing a slurry comprising nanocellulose and cellulosic fibers,
   forming a fiber based layer having an air resistance of less than 4000 s/100 ml measured according to ISO5636/6 from said slurry, wherein the fiber based layer comprises 60-90 wt-% of nanocellulose based on the total cellulosic content of the fiber based layer,
   providing a polymer layer,
   attaching the polymer layer to at least one side of the fiber based layer characterized in the formation of the fiber based layer is done at a production speed of at least 250 m/min.

15. The method according to claim 14 wherein the step of forming the fiber based layer comprises the steps of:
   conducting said slurry to a wire to form a web,
   dewatering the web on the wire, and
   drying the web to form said fiber based layer.

16. The method according to claim 14 wherein the step of forming the fiber based layer comprises the steps of:
   conducting said slurry to a substrate by cast coating to form a web,
   and
   drying the web to form said fiber based layer.

17. The method according to claim 14 wherein the step of forming the fiber based layer comprises the steps of:
   conducting said slurry to a substrate by cast coating to form a web,
   removing said web from the substrate, and
   drying the web to form said fiber based layer.

18. A paper or paperboard product laminated with the laminate according to claim 1.

19. A wrapping paper comprising the laminate according to claim 1.

20. A pouch comprising the laminate according to claim 1.

* * * * *